United States Patent
Huang et al.

(10) Patent No.: US 11,695,665 B2
(45) Date of Patent: Jul. 4, 2023

(54) CROSS-CLOUD CONNECTIVITY CHECKS

(71) Applicant: VMware, Inc., Palo Alto, CA (US)

(72) Inventors: Qiao Huang, Beijing (CN); Donghai Han, Beijing (CN); Qiong Wang, Beijing (CN); Xu Wang, Beijing (CN); Xinghua Hu, San Jose, CA (US); Yuping Wei, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/550,311

(22) Filed: Aug. 26, 2019

(65) Prior Publication Data

US 2021/0014142 A1 Jan. 14, 2021

(30) Foreign Application Priority Data

Jul. 9, 2019 (WO) ................ PCT/CN2019/095255

(51) Int. Cl.
*H04L 43/065* (2022.01)
*H04L 41/046* (2022.01)
*H04L 43/0811* (2022.01)
*H04L 43/10* (2022.01)

(52) U.S. Cl.
CPC .......... *H04L 43/065* (2013.01); *H04L 41/046* (2013.01); *H04L 43/0811* (2013.01); *H04L 43/10* (2013.01)

(58) Field of Classification Search
CPC ..... H04L 43/065; H04L 41/046; H04L 43/10; H04L 43/0811
See application file for complete search history.

(56) References Cited

U.S. PATENT DOCUMENTS

| | | |
|---|---|---|
| 5,987,506 A | 11/1999 | Carter et al. |
| 9,058,229 B2 | 6/2015 | Locker et al. |
| 9,497,107 B1* | 11/2016 | Akiya ................ H04L 43/10 |
| 10,778,659 B2 | 9/2020 | Tola et al. |
| 2011/0179136 A1 | 7/2011 | Twitchell, Jr. |
| 2011/0295998 A1 | 12/2011 | Ferris et al. |
| 2012/0017265 A1 | 1/2012 | Twitchell, Jr. |
| 2013/0297769 A1 | 11/2013 | Chang et al. |
| 2013/0332588 A1 | 12/2013 | Maytal et al. |

(Continued)

*Primary Examiner* — Suraj M Joshi
*Assistant Examiner* — Jaren Means
(74) *Attorney, Agent, or Firm* — Su IP Consulting

(57) ABSTRACT

Example methods and systems are provided for cross-cloud connectivity checks. One example method may include detecting a first connectivity check packet that is addressed from a first virtualized computing instance deployed in a first cloud environment; and determining that the first connectivity check packet is destined for a second virtualized computing instance in a second cloud environment reachable via the network device. The method may also comprise: generating a second connectivity check packet by modifying the first connectivity check packet to include one or more indicators that a connectivity check is required along a datapath towards the second virtualized computing instance in the second cloud environment. The method may further comprise: sending the second connectivity check packet to cause one or more observation points along the datapath to, based on the one or more indicators, generate and send report information associated with the second connectivity packet.

21 Claims, 6 Drawing Sheets

(56) References Cited

U.S. PATENT DOCUMENTS

| | | |
|---|---|---|
| 2014/0082177 A1 | 3/2014 | Lemire et al. |
| 2014/0108665 A1 | 4/2014 | Arora et al. |
| 2014/0181319 A1 | 6/2014 | Chen et al. |
| 2014/0365549 A1 | 12/2014 | Jenkins |
| 2015/0009990 A1 | 1/2015 | Sung et al. |
| 2015/0009991 A1 | 1/2015 | Sung et al. |
| 2015/0341240 A1 | 11/2015 | Iyoob et al. |
| 2016/0080221 A1* | 3/2016 | Ramachandran ... H04L 12/4633 709/224 |
| 2016/0080230 A1 | 3/2016 | Anand et al. |
| 2016/0105393 A1 | 4/2016 | Thakkar et al. |
| 2017/0060628 A1 | 3/2017 | Tarasuk-Levin et al. |
| 2017/0078176 A1 | 3/2017 | Lakshmikantha et al. |
| 2017/0083354 A1 | 3/2017 | Thomas et al. |
| 2017/0371696 A1 | 12/2017 | Prziborowski et al. |
| 2018/0270130 A1 | 9/2018 | Wang et al. |
| 2019/0020588 A1 | 1/2019 | Twitchell, Jr. |
| 2019/0028424 A1 | 1/2019 | Mittal et al. |
| 2019/0059117 A1* | 2/2019 | Shu ................ H04W 76/25 |
| 2019/0222440 A1* | 7/2019 | Huang ............. H04L 63/0272 |
| 2020/0145299 A1* | 5/2020 | Do .................. H04L 41/0816 |
| 2020/0252205 A1 | 8/2020 | Padmanabhan |
| 2021/0184953 A1 | 6/2021 | Huang et al. |
| 2021/0399961 A1 | 12/2021 | Huang et al. |

* cited by examiner

*Connectivity check packet information*

| Packet | Observation type / status | |
|---|---|---|
| P1 | `src=VM1:(IP-1,MAC-1),dst=VM5:(IP-5,MAC-5)` | ~510 |
| P2 | `src=(IP-1,MAC-TRACE),dst=(IP-5,MAC-5), metadata=MAC-TRACE` | ~520 |

*Report information*

| Observation point | Observation type | |
|---|---|---|
| LP1 | INJECTED | ~531 |
| DR1 | RECEIVED+FORWARDED | ~532 |
| EDGE | RECEIVED+FORWARDED | ~533 |
| VGW | RECEIVED+FORWARDED | ~534 |

CROSS-CLOUD CONNECTIVITY CHECKS

CROSS-REFERENCE TO RELATED APPLICATION

The present U.S. patent application Ser. No. 16/550,311 claims the benefit under 35 U.S.C. § 119(a) of Patent Cooperation Treaty (PCT) Application No. PCT/CN2019/095255, filed Jul. 9, 2019, which is incorporated herein by reference.

BACKGROUND

Virtualization allows the abstraction and pooling of hardware resources to support virtual machines in a software-defined data center (SDDC). For example, through server virtualization, virtualization computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, a user (e.g., organization) may run VMs using on-premise data center infrastructure that is under the user's private ownership and control. Additionally, the user may run VMs in the cloud using infrastructure under the ownership and control of a public cloud provider. Since various network issues may affect traffic among VMs deployed in different cloud environments, it is desirable to perform network troubleshooting and diagnosis to identify those issues.

DETAILED DESCRIPTION

Figure 1:
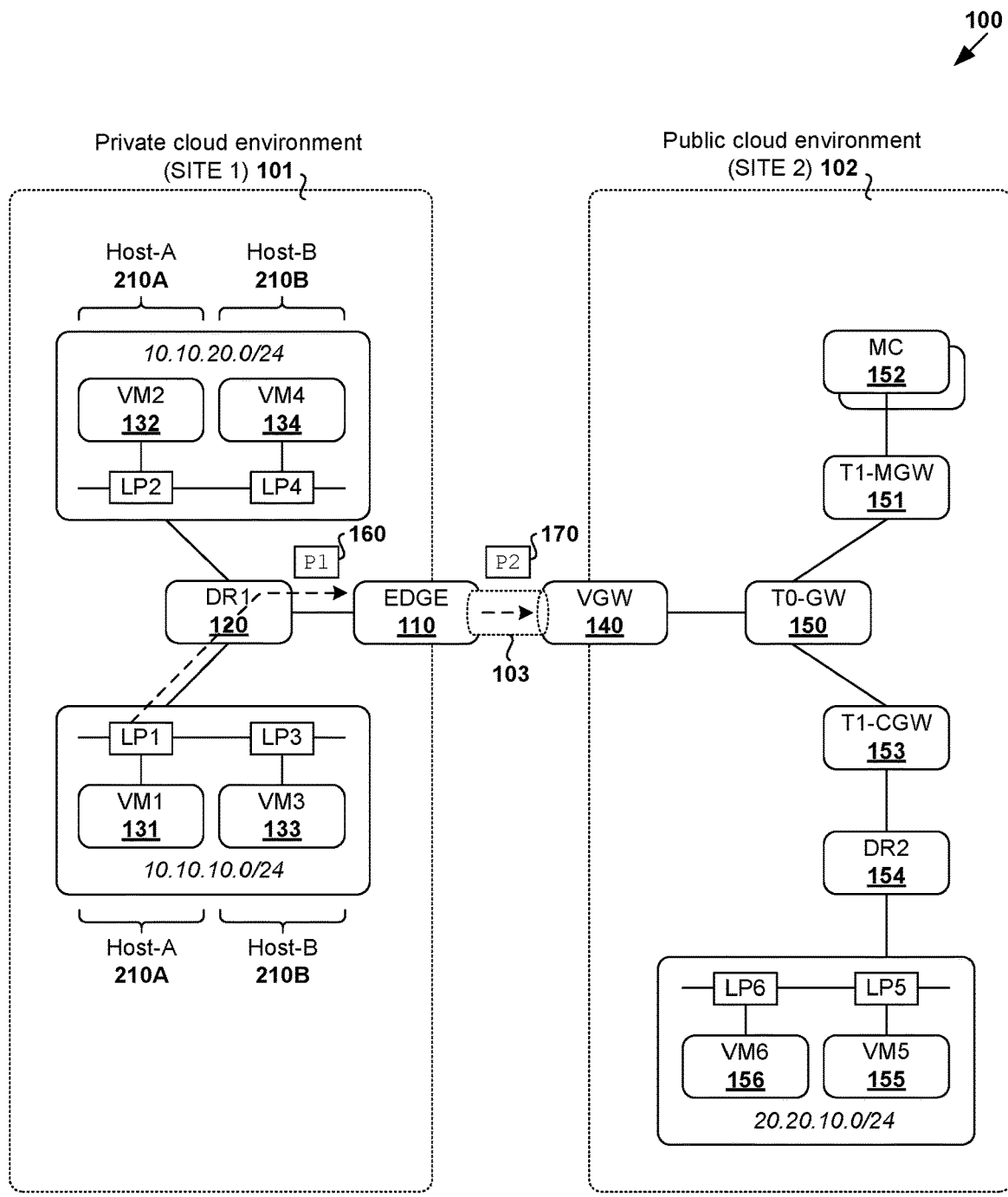
FIG. 1 is a schematic diagram illustrating example software-defined networking (SDN) environment in which cross-cloud connectivity checks may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to network troubleshooting and diagnosis will now be explained in more detail using FIG. 1, which is a schematic diagram illustrating example software-defined networking (SDN) environment 100 in which cross-cloud connectivity check may be performed. It should be understood that, depending on the desired implementation, SDN environment 100 may include additional and/or alternative components than that shown in FIG. 1.

In the example in FIG. 1, SDN environment 100 spans across multiple geographical sites, such as a first geographical site where private cloud environment 101 ("first cloud environment") is located, a second geographical site where public cloud environment 102 ("second cloud environment") is located, etc. In practice, the term "private cloud environment" may refer generally to an on-premise data center or cloud platform supported by infrastructure that is under an organization's private ownership and control. In contrast, the term "public cloud environment" may refer generally a cloud platform supported by infrastructure that is under the ownership and control of a public cloud provider. Although the terms "first" and "second" are used to describe various elements, these elements should not be limited by these terms. These terms are used to distinguish one element from another. For example, a first element may be referred to as a second element, and vice versa.

In practice, a public cloud provider is generally an entity that offers a cloud-based platform to multiple users or tenants. This way, a user may take advantage of the scalability and flexibility provided by public cloud environment 102 for data center capacity extension, disaster recovery, etc. Depending on the desired implementation, public cloud environment 102 may be implemented using any suitable cloud technology, such as Amazon Web Services® (AWS) and Amazon Virtual Private Clouds (VPCs); VMware Cloud™ on AWS; Microsoft Azure®; Google Cloud Platform™, IBM Cloud™; a combination thereof, etc. Amazon VPC and Amazon AWS are registered trademarks of Amazon Technologies, Inc.

EDGE 110 is a network device that is deployed at the edge of private cloud environment 101 to handle traffic to and from public cloud environment 102. Here, the term "network device" or "computer system" may refer generally to an entity that is implemented using one or more virtual machines (VMs) and/or physical machines (also known as "bare metal machines"), and capable of performing functionalities of a switch, router (e.g., logical service router), bridge, gateway, edge appliance, or any combination thereof. This way, virtual machines (VMs) such as 131-134 in private cloud environment 101 may connect with public cloud environment 102 via EDGE 110.

Figure 2:
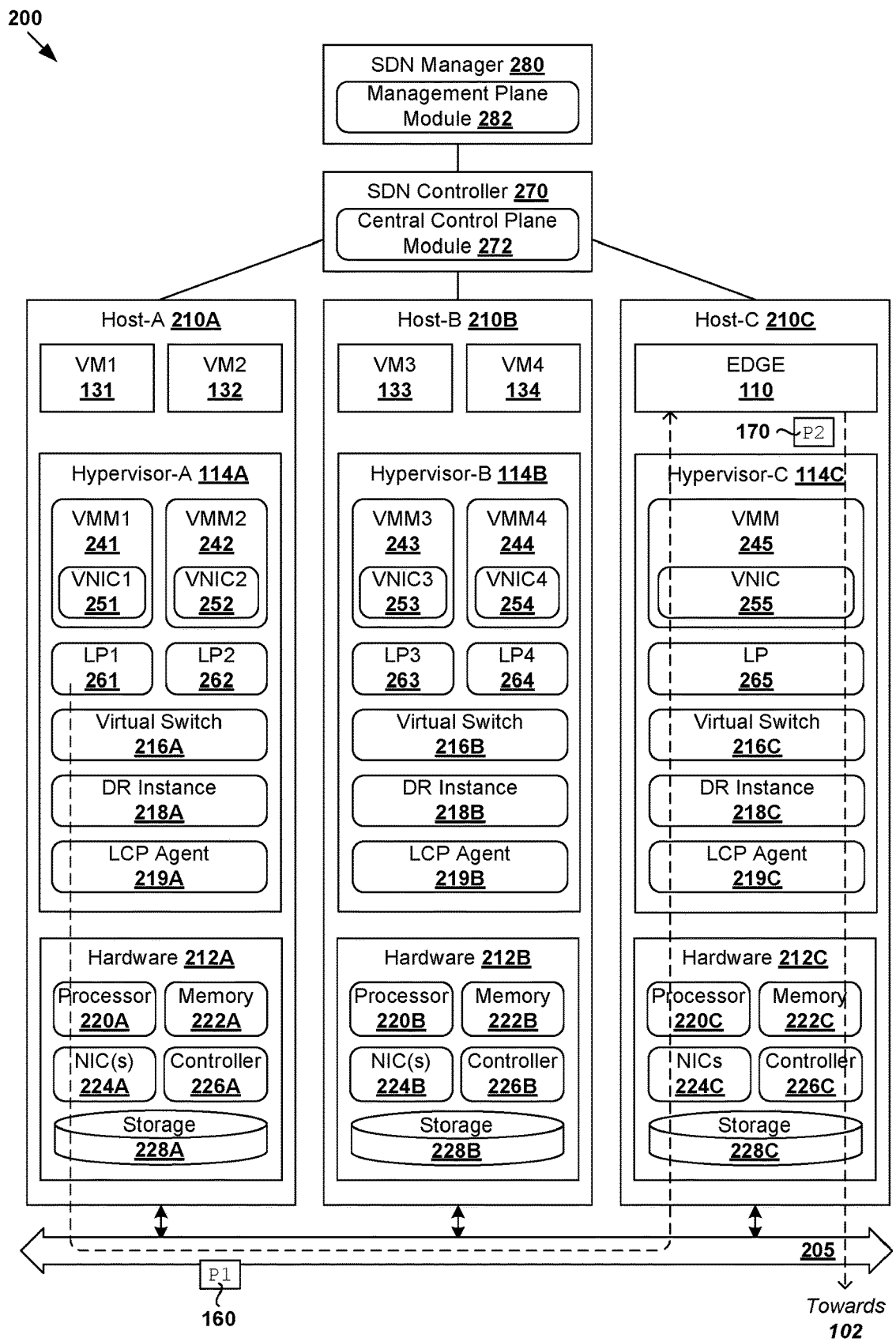
FIG. 2 is a schematic diagram illustrating a physical implementation view of an example cloud environment in FIG. 1.

VMs 131-134 will be explained in more detail using FIG. 2, which is a schematic diagram illustrating physical implementation view 200 of example cloud environment 101 in FIG. 1. Depending on the desired implementation, physical implementation view 200 may include additional and/or alternative component(s) than that shown in FIG. 2. In this example, VMs 131-132 are supported by host-A 210A, VMs 133-134 by host-B 210B and EDGE 110 (i.e., a VM) by host-C 210C. Hosts 210A-C (also known as "end hosts," "computing devices", "host computers", "host devices", "physical servers", "server systems", "physical machines," "transport nodes," etc.) are interconnected via physical network 205.

Hosts 210A-C may each include virtualization software (e.g., hypervisor 214A/214B/214C) that maintains a mapping between underlying hardware 212A/212B/212C and virtual resources allocated to VMs 131-134 and EDGE 110. Hardware 212A/212B/212C includes suitable physical components, such as processor(s) 220A/220B/220C; memory 222A/222B/222C; physical network interface controller(s) or NIC(s) 224A/224B/224C; and storage disk(s) 228A/228B/228C accessible via storage controller(s) 226A/226B/226C, etc. Virtual resources are allocated to each VM to support a guest operating system (OS) and applications (not shown for simplicity).

Corresponding to hardware 212A/212B/212C, the virtual resources may include virtual CPU, guest physical memory, virtual disk, virtual network interface controller (VNIC), etc. Hardware resources may be emulated using virtual machine monitors (VMMs) 241-245, which may be considered as part of (or alternatively separated from) corresponding VMs 131-134. For example in FIG. 2, VNICs 251-254 are virtual network adapters that are emulated by corresponding VMMs 241-244. In practice, physical network 205 may be formed by various intermediate network devices, such as physical network devices (e.g., physical switches, physical routers, etc.) and/or logical network devices (e.g., logical switches, logical routers, etc.).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 214A/214B/214C implements virtual switch 216A/216B/216C and logical distributed router (DR) instance 218A/218B/218C to handle egress packets from, and ingress packets to, corresponding VMs 131-134, 110. In the example in FIG. 2, logical switches and logical DRs may be implemented in a distributed manner and can span multiple hosts to connect VMs 131-134, 110. For example, logical switches that provide logical layer-2 connectivity may be implemented collectively by virtual switches 216A-C and represented internally using forwarding tables (not shown) at respective virtual switches 216A-C. The forwarding tables may each include entries that collectively implement the respective logical switches. Further, logical DRs that provide logical layer-3 connectivity may be implemented collectively by DR instances 218A-C and represented internally using routing tables (not shown) at respective DR instances 218A-C. The routing tables may each include entries that collectively implement the respective logical DRs.

Packets may be received from, or sent to, each VM via an associated logical port. For example, logical ports 261-265 are associated with respective VMs 131-134, EDGE 110. Here, the term "logical port" may refer generally to a port on a logical switch to which a virtualized computing instance is connected. A "logical switch" may refer generally to an SDN construct that is collectively implemented by virtual switches 216A-C in FIG. 2, whereas a "virtual switch" may refer generally to a software switch or software implementation of a physical switch. In practice, there is usually a one-to-one mapping between a logical port on a logical switch and a virtual port on virtual switch 216A/216B/216C. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Through virtualization of networking services, logical overlay networks (also known as "logical network") may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. For example, VM1 131 on host-A 210A and VM3 133 on host-B 210B may be connected to the same logical switch, and the same logical layer-2 segment associated with first subnet=10.10.10.0/24. In another example, VM2 132 and VM4 134 may deployed on the same segment associated with second subnet=10.10.20.0/24. Both segments may be connected to a common logical DR1 120, which may be implemented using DR instances 218A-C spanning respective hosts 210A-C.

Hosts 210A-C may maintain data-plane connectivity with other host(s) via physical network 104 to facilitate communication among VMs 131-134 and EDGE 110. Hypervisor 214A/214B/214C may implement a virtual tunnel endpoint (VTEP) to encapsulate and decapsulate packets with an outer header (also known as a tunnel header) identifying the relevant logical overlay network (e.g., VNI=6000). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC-B, VTEP-B) and hypervisor-C 114C implements a third VTEP with (IP-C, MAC-C, VTEP-C). Encapsulated packets may be sent via an end-to-end, bi-directional communication path (known as a tunnel) between a pair of VTEPs over physical network 205.

SDN controller 280 and SDN manager 270 are example network management entities that facilitate management of various entities deployed in cloud environment 101/102. An example SDN controller is the NSX controller component of VMware NSX® (available from VMware, Inc.) that resides on a central control plane, and connected to SDN manager 280 (e.g., NSX manager) on a management plane. Management entity 270/280 may be implemented using physical machine(s), virtual machine(s), a combination thereof, etc. Management entity 270/280 may maintain control-plane connectivity with local control plane (LCP) agent 219A/219B/219C on each host to exchange control information.

Conventionally, to perform a connectivity check between VM1 131 and VM3 133, a special packet (e.g., connectivity check packet) may be injected by management entity 270/280 at host-A 210A for transmission to host-B 210B within the same cloud environment 101. The special packet may include an inner packet that is encapsulated with an outer header. The inner packet may be addressed from VM1 131 (e.g., source IP-1) to VM3 133 (e.g., destination IP-3). The outer header of the connectivity check packet may include address information of source host-A 210A (e.g., VTEP IP-A) and destination host-B 210B (e.g., VTEP IP-B). This way, the transmission of the connectivity check packet may be monitored to detect any network connectivity issue.

However, for destinations that are external to private cloud environment 101, EDGE 110 typically drops such special packets that are injected for connectivity checks. In this case, it is more challenging for network administrators to diagnose any cross-cloud network connectivity issues, such as between VM1 131 in private cloud environment 101 and VM5 155 in public cloud environment 102. As the scale and complexity of cloud environments 101-102 increases, network troubleshooting and debugging may become increasingly time- and resource-consuming. This may in turn increase system downtime due to undiagnosed performance issues.

Cross-Cloud Connectivity Checks

According to examples of the present disclosure, network troubleshooting and diagnosis may be improved by extending the connectivity check functionality to cross-cloud environments. Instead of dropping connectivity check packets at EDGE 110, the connectivity check packets may be modified to cause "observation point(s)" outside of private cloud environment 101 to send report information associated with cross-cloud network connectivity.

Throughout the present disclosure, public cloud environment 102 will be exemplified using VMware Cloud™ on AWS. It should be understood that any additional and/or additional cloud technology may be implemented. In the example in FIG. 1, EDGE 110 is connected with public cloud environment 102 via a virtual gateway 140 (VGW) that is connected with tier-1 management gateway 151 (labelled "T1-MGW") and tier-1 compute gateway 153 (labelled "T1-CGW") via tier-0 gateway 150 (labelled "T0-GW"). In practice, T0-GW 150, MGW 151 and CGW 153 may be logical constructs that are implemented by an edge appliance in public cloud environment 102.

T1-MGW 151 may be deployed to handle management-related traffic to and/or from management component(s) 152 (labelled "MC") for managing various entities within public cloud environment 102. T1-CGW 153 may be deployed to handle workload-related traffic to and/or from VMs, such as VM5 155 and VM6 156 on 20.20.20.20/24. EDGE 110 in private cloud environment 101 may communicate with VGW 140 in public cloud environment 102 using any suitable tunnel(s) 103, such as Internet Protocol Security (IPSec), layer-2 virtual private network (L2VPN), direct connection, etc.

Figure 3:
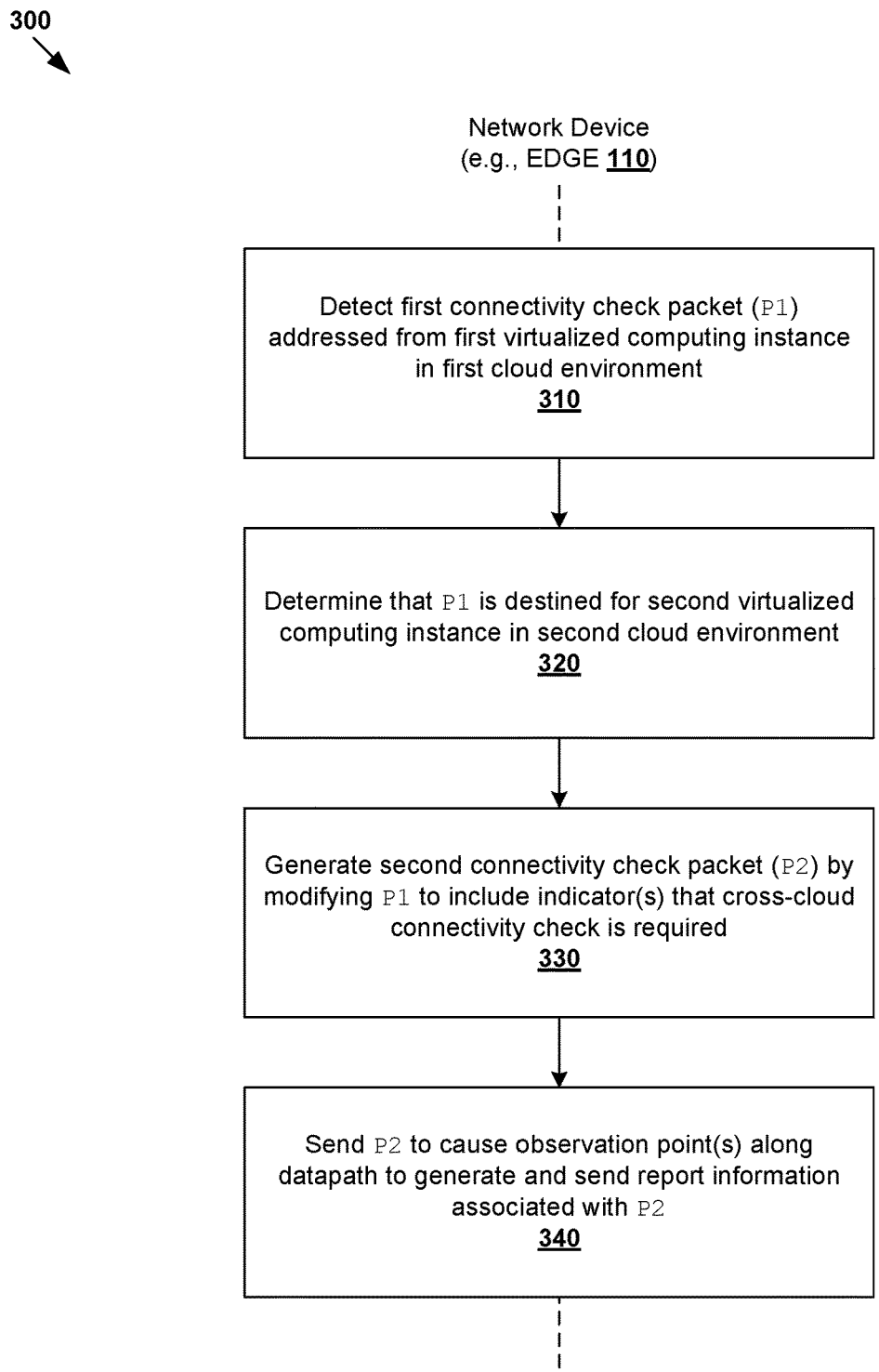
FIG. 3 is a flowchart of an example process for a network device to perform cross-cloud connectivity check in an SDN environment.

In more detail, FIG. 3 is a flowchart of example process 300 for network device 110 to perform cross-cloud connectivity check in SDN environment 100. Example process 300 may include one or more operations, functions, or actions illustrated by one or more blocks, such as 310 to 340. The various blocks may be combined into fewer blocks, divided into additional blocks, and/or eliminated depending on the desired implementation. In the following, various examples will be discussed using private cloud environment 101 as a "first cloud environment," public cloud environment 102 as a "second cloud environment," EDGE 110 as example "network device," VM1 131 as an example "first virtualized computing instance" or "first endpoint," VM5 155 as example "second virtualized computing instance" or "second endpoint," etc.

At 310 in FIG. 3, EDGE 110 may detect a first connectivity check packet (see "P1" 160 in FIGS. 1-2) that is addressed from VM1 131 deployed in private cloud environment 101. At 320, 330 and 340, in response to determination that P1 160 is destined for VM5 155 in public cloud environment 102, EDGE 110 may generate and send a second connectivity check packet (see "P2" 170 in FIGS. 1-2) by modifying P1 160 to include indicator(s) that a connectivity check is required along a datapath towards VM5 155 in public cloud environment 102. This way, P2 170 may be sent to cause observation point(s) along the datapath towards VM5 155 to, based on the indicator(s), generate and send report information associated with P2 170.

As used herein, the term "observation point" may refer generally to any suitable entity or node that is located along a datapath between a pair of virtualized computing instances (e.g., VM1 131 and VM5 155). An entity may be a physical entity, such as a host, physical switch, physical router, etc. Alternatively, an entity may be a logical entity, such as a logical port, VNIC, distributed firewall, logical forwarding element (e.g., logical switch, logical router), etc. A combination of physical and logical entities may be used as observation points. For example in FIG. 1, observation point(s) in private cloud environment 101 may include logical port LP1 261, DR1 120, EDGE 110, or any combination thereof. Observation point(s) in public cloud environment 102 may include VGW 140, T0-GW 150, T1-CGW 153, logical distributed router DR2 154, logical port LP5, or any combination thereof.

As will be discussed using FIGS. 4-6, block 330 may involve modifying source address information (e.g., source MAC address=MAC-1 of VM1 131) in P1 160 to specify first indicator=predetermined address (e.g., MAC-TRACE) indicating that the connectivity check is required. Additionally, block 330 may involve appending second indicator=predetermined address (e.g., MAC-TRACE) to P1 160 to cause observation point(s) to compare the first and second indicators when determining whether connectivity checks are required.

The report information at block 340 may indicate whether P2 170 has been received, forwarded, delivered or dropped in public cloud environment 102. EDGE 110 may receive the report information from the observation point(s), and send the report information to management entity 270/280.

This way, management entity 270/280 may aggregate report information from various observation point(s) in both cloud environments 101-102 to identify any cross-cloud connectivity issues. Various examples will be described using FIGS. 4-6 below.

FIRST EXAMPLE

Figure 4:
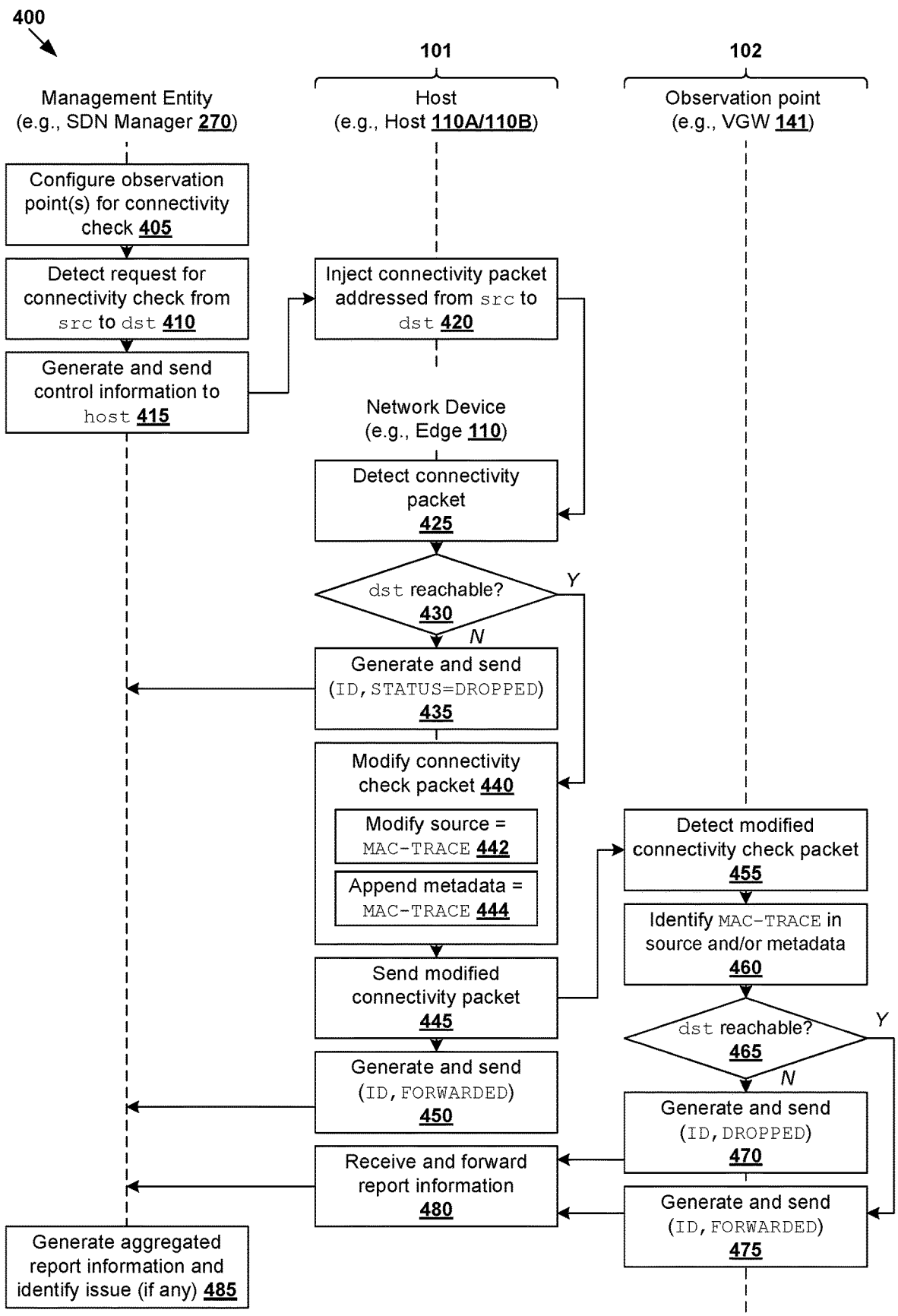
FIG. 4 is a flowchart of an example detailed process for cross-cloud connectivity check in an SDN environment.

FIG. 4 is a flowchart of example detailed process 400 for cross-cloud connectivity check in SDN environment 100. Example process 400 may include one or more operations, functions, or actions illustrated at 405 to 485. The various operations, functions or actions may be combined into fewer blocks, divided into additional blocks, and/or eliminated depending on the desired implementation. The example in FIG. 4 will be explained using FIG. 5, which is a schematic diagram illustrating first example 500 of cross-cloud connectivity check in SDN environment 100.

In the following, consider a cross-cloud connectivity check between VM1 131 on host-A 210A in private cloud environment 101 and VM5 155 in public cloud environment 102. In practice, any suitable approach may be used to generate and inject connectivity check packets. For example, a tool called Traceflow (available from VMware, Inc.) may be extended to inject a connectivity check packet (e.g., Traceflow packet) for cross-cloud connectivity checks.

(a) Configuration

At 405 in FIG. 4, any suitable observation point(s) may be configured to perform connectivity check in cloud environment 101-102. In one example, SDN manager 270 may send control information specifying a fixed MAC address (e.g., MAC-TRACE) to T0-MGW 151 and/or management component(s) 152, which then cause the observation point(s) to learn the MAC address for connectivity check purposes in public cloud environment 102. In practice, MAC-TRACE may be a fixed MAC address that is configured for multiple connectivity check sessions (e.g., Traceflow sessions), each having a unique session ID.

At 410 in FIG. 4, SDN manager 270 receives a user's request to perform a cross-cloud connectivity check between VM1 131 in private cloud environment 101 and VM5 155 in public cloud environment 102. This is to trace a datapath between VM1 131 and VM5 155 to determine, for example, whether they are connected. In practice, the request may be received from a user device (e.g., operated by a network administrator) via any suitable interface supported by SDN manager 270, such as graphical user interface (GUI), command-line interface (CLI), application programming interface (API) calls, etc.

At 415 in FIG. 4, in response to receiving the user's request, SDN manager 270 identifies transport node=host-A 210A supporting VM1 131. Depending on the desired implementation, block 410 may involve SDN manager 270 (e.g., using management plane module 272) generating and sending a query to SDN controller 280 (e.g., central control plane 282). Further, SDN manager 270 generates and sends control information (see "C" 505 in FIG. 5) to host-A 210A to instruct host-A 210A to inject a connectivity check packet at logical port=LP1 261 associated with source VM1 131 for transmission to destination VM5 155.

(b) Private Cloud Environment

At 420 in FIG. 4, in response to receiving control information 505, host-A 210A injects the connectivity check packet (labelled "P1" 510 in FIG. 5) at logical port=LP1 261. In one example, packet "P1" 510 may be generated by SDN manager 270. In this case, the control information at block 415 includes packet "P1" 510 and an instruction for host-A 210A to inject it at logical port=LP1 151. Alternatively, the control information may be an instruction for host-A 210A to generate and inject the packet.

Connectivity check packet P1 510 includes an inner packet specifying source information (IP address=IP-1, MAC address=MAC-1) associated with VM1 131, and destination information (IP-5, MAC-5) associated with VM5 155. Depending on the desired implementation, host-A 210A and host-C 210C may be connected via a logical overlay network. In this case, to reach EDGE 110 supported by host-C 210C, packet P1 510 may be encapsulated with an outer header (e.g., GENEVE encapsulation) specifying source information (VTEP IP address=IP-A, MAC address=MAC-A) associated with host-A 210A, and destination information (IP-C, MAC-C) associated with host-C 210C.

At 425 and 430 in FIG. 4, in response to detecting packet P1 510, EDGE 110 may check the reachability of destination (IP-5, MAC-5) specified by packet P1 510. Using VMware Cloud for example, EDGE 110 may generate and send a query to SDN manager 270 to check whether VM5 155 (supporting a VMC app) exists. If the destination is unreachable (e.g., VMC app not found in a configuration file) based on a response from SDN manager 270, packet P1 510 will be dropped. In this case, at 430 (no) and 435, EDGE 110 may generate and send report information to SDN manager 270 specifying (ID=EDGE, STATUS=DROPPED) to report the packet drop.

Otherwise, at 430 (yes) and 440 in FIG. 4, in response to determination that the destination of P1 510 is reachable, EDGE 110 may generate second connectivity packet P2 520 to include indicator(s) that cross-cloud connectivity check is required along a datapath towards VM5 155 in public cloud environment 102. For example, block 440 may include modifying source address information to replace source MAC=MAC-1 associated with VM1 131 with predetermined address=MAC-TRACE and/or appending metadata=MAC-TRACE to the header or payload of packet P1 510. See 442-444 in FIG. 4. By modifying an existing packet field (e.g., MAC header or payload field) of P1 170 to support cross-cloud connectivity check, it is not necessary for observation point(s) in public cloud environment 102 to process any additional encapsulated headers.

At 445 in FIG. 4, EDGE 110 forwards packet P2 520 towards VM5 155 public cloud environment 102. Further, report information associated with packet P1 510 is generated and sent to SDN manager 270. In practice, any observation point(s) within private cloud environment 101 may be configured to generate and send report information to SDN manager 270. For example, each observation point may send report information or path information in the form of (ID, STATUS). The "ID" may include any suitable information identifying its sender, such as a unique ID, name, type (e.g., physical entity, logical switch port, logical switch, logical router port, logical router, distributed firewall, gateway, etc.). The "STATUS" may be "RECEIVED," "FORWARDED," "DELIVERED," "DROPPED," etc. The report information may also include a timestamp.

Figure 5:
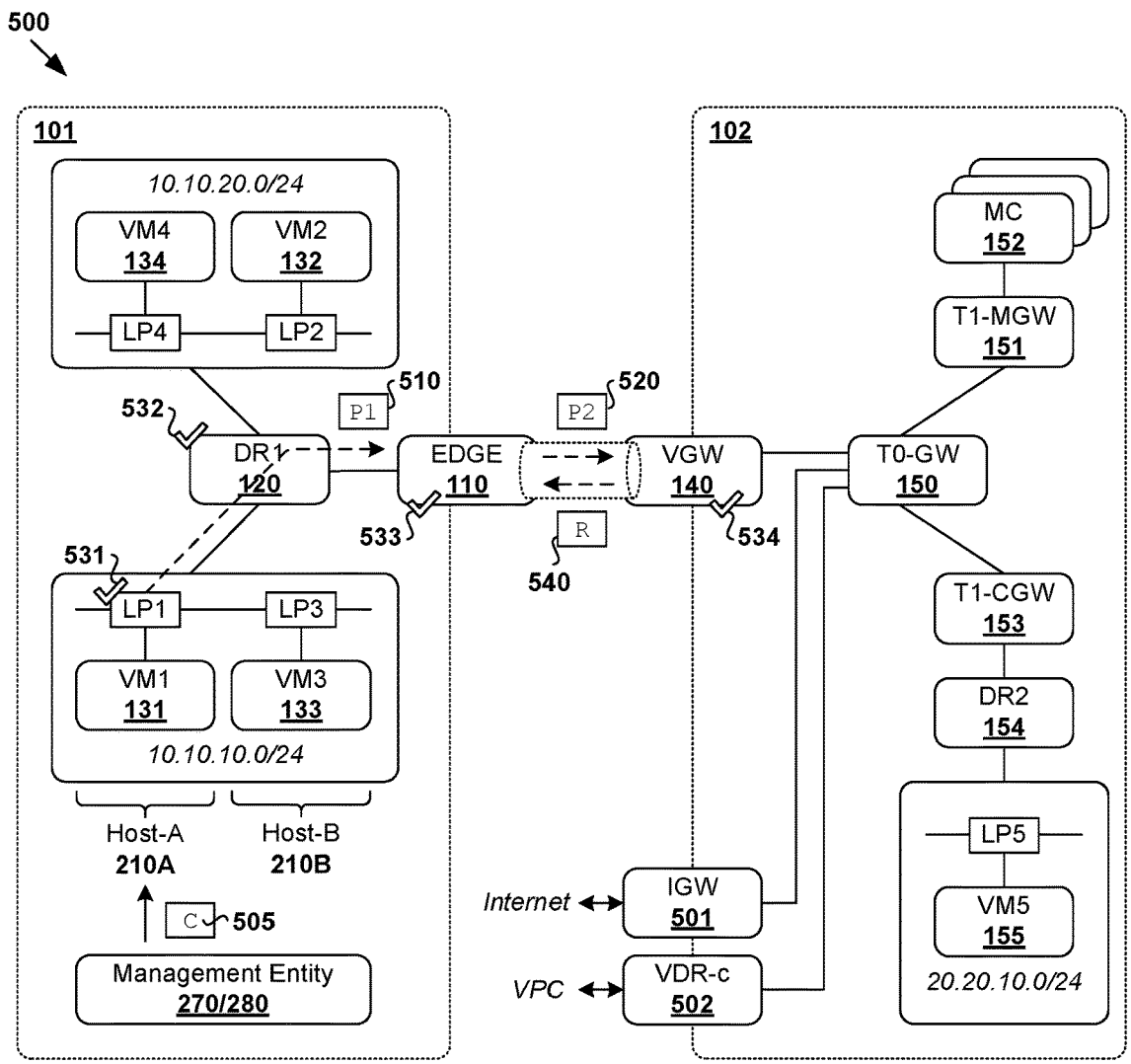
FIG. 5 is a schematic diagram illustrating a first example of cross-cloud connectivity check in an SDN environment.

In the example in FIG. 5, SDN manager 270 may receive report information 531-533 from respective observation points within private cloud environment 101. At 531, LP1 261 connected to VM1 131 reports (ID=LP1, STATUS=INJECTED) to SDN manager 270. At 532, DR1

120 reports (ID=DR1, STATUS=RECEIVED+FORWARDED). At 533, (ID=EDGE, STATUS=RECEIVED+FORWARDED) is received from EDGE 110. In other words, report information 531-533 indicates no connectivity issue in private cloud environment 101.

(c) Public Cloud Environment

At 455 and 460 in FIG. 4, in response to detecting packet P2 520 via tunnel 103, VGW 140 in public cloud environment 102 may examine the packet to identify any indicator(s) for connectivity checks. Depending on the desired implementation, block 460 may involve detecting source MAC address=MAC-TRACE and/or metadata=MAC-TRACE in packet P2 520. Block 460 may also involve comparing both indicators to determine whether source MAC address=MAC-TRACE matches with metadata=MAC-TRACE.

At 465 in FIG. 4, in response to determination that connectivity check is required, VGW 140 determines whether destination (IP-5, MAC-5) is reachable, such as by checking a local forwarding table (e.g., AWS route table). If yes, at 475, VGW 140 generates and sends report information specifying (ID=VGW, RECEIVED and FORWARDED) to EDGE 110, thereby indicating there is no connectivity issue up until VGW 140. Otherwise, at 470, report information specifying (ID=VGW, DROPPED) will be sent to EDGE 110 for subsequent transmission to SDN manager 270. In both cases, the report information (i.e., FORWARDED or DROPPED) is indicated at 540 in FIG. 5. In practice, EDGE 110 may record an ID associated with each connectivity check session to track report information associated with the session.

At 480 and 485 in FIG. 4, in response to receiving report information 540 (labelled "R" in FIG. 5) from VGW 140, EDGE 110 may inspect and forward report information 540 to SDN manager 270 for aggregation. In the example in FIG. 5, SDN manager 270 may receive report information (ID=VGW, RECEIVED+FORWARDED) from VGW 140 in public cloud environment 102; see 534. To review the results, a user may access aggregated report information 531-534 collected by various observation points via any suitable user interface supported by SDN manager 270. Based on aggregated report information 531-534, any cross-cloud connectivity issue between VM1 131 and VM5 155 may be identified.

SECOND EXAMPLE

It should be understood that any number of observation points may be configured in cloud environments 101-102 to perform cross-cloud connectivity check. Increasing the number of observation points will improve the granularity of the report information, while decreasing the number of observation points has the opposite effect. An increased number of observation points will be explained using FIG. 6, which is a schematic diagram illustrating second example 600 of cross-cloud connectivity check in SDN environment 100. Here, consider a cross-cloud connectivity check between VM3 133 ("first virtualized computing instance") and VM6 156 ("second virtualized computing instance"). Besides VGW 140, additional observation points in public cloud environment 102 may be configured at block 405 in FIG. 4, such as T0-GW 150, T1-CGW 153, DR2 154 and a logical port "LP6" to which VM6 156 is connected.

(a) Private Cloud Environment

Figure 6:
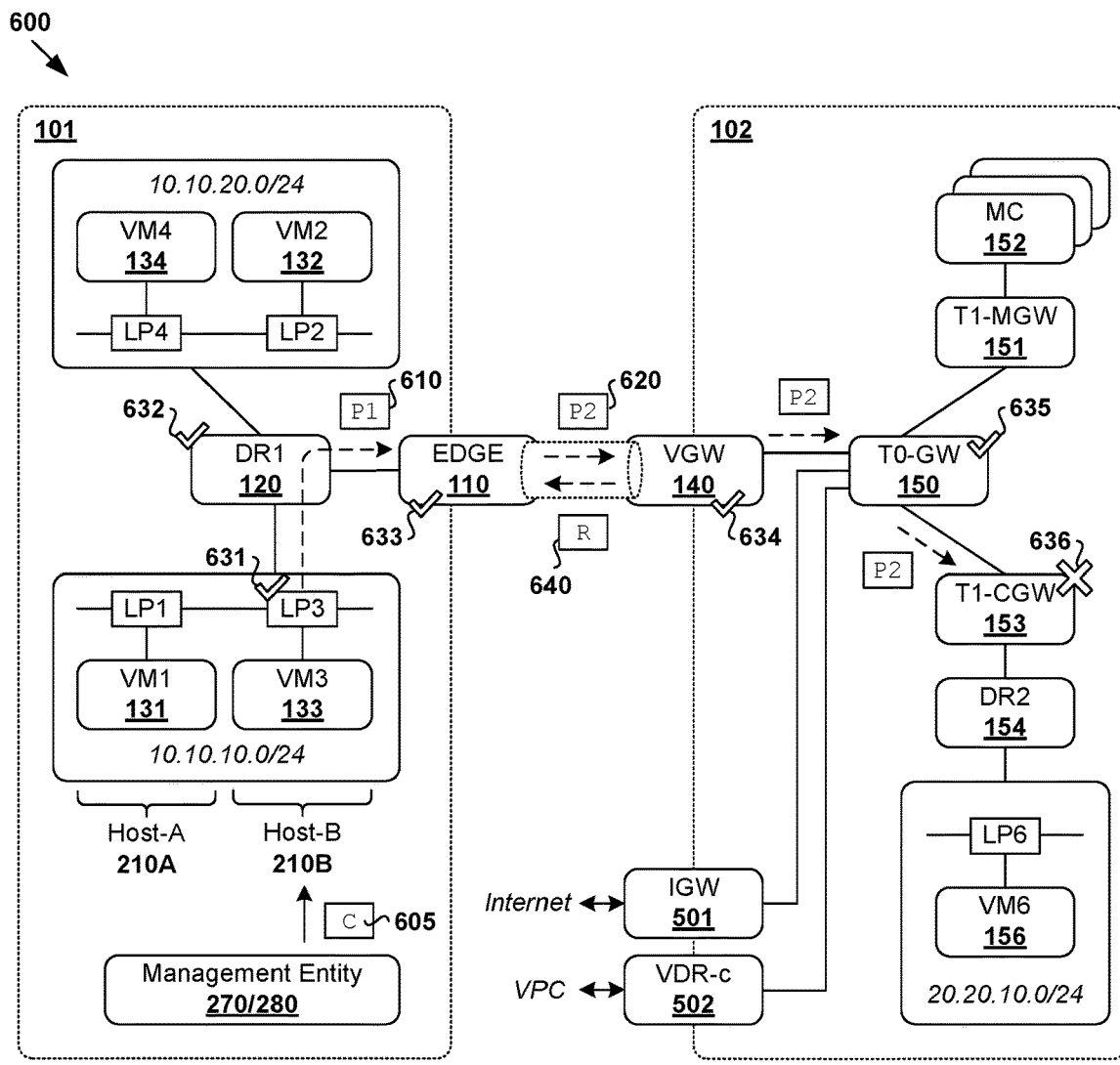
FIG. 6 is a schematic diagram illustrating a second example of cross-cloud connectivity check in an SDN environment.

Referring first to 610 in FIG. 6, in response to receiving control information (see "C" 605 in FIG. 6) from SDN manager 270 via SDN controller 280, host-B 210B supporting VM3 133 may inject connectivity check packet P1 610 at LP3 263. Packet P1 610 includes an inner packet specifying source information (IP address=IP-3, MAC address=MAC-3) associated with VM3 133, and destination information (IP-6, MAC-6) associated with VM6 156. To reach EDGE 110, packet P1 610 may be encapsulated with an outer header (e.g., GENEVE) specifying source information (VTEP IP address=IP-B, MAC address=MAC-B) associated with host-B 210B, and destination information (IP-C, MAC-C) associated with host-C 210C. See 410-420 in FIG. 4.

Since packet P1 610 is destined for an external network, packet P1 610 is forwarded to EDGE 110 acting as a default gateway. In response to detecting packet P1 610 and determining that VM6 136 is reachable, EDGE 110 may modify P1 610 to include indicator(s) to cause observation point(s) within public cloud environment 102 to generate and send report information. Similar to the example in FIG. 5, this may involve modifying source MAC address from MAC-3 to MAC-TRACE and/or appending metadata=MAC-TRACE to packet P1 610. See corresponding 425-450 in FIG. 4.

(b) Public Cloud Environment

In public cloud environment 102, packet P2 620 is forwarded along a datapath towards VM6 156 via various observation points (e.g., VGW 140, T0-GW 150 and T1-CGW 153). In response to detecting packet P2 520 that includes indicator=MAC-TRACE, each observation point in public cloud environment 102 may determine whether VM6 136 is reachable before generating and sending report information to SDN manager 270 via EDGE 110. See corresponding 455-475 in FIG. 4. Example report information 640 may include 634-636 collected by various observation points in FIG. 6.

As such, SDN manager 270 may obtain report information 631-636 from various observation points within multiple cloud environments 101-102. At 631 in FIG. 6, LP3 263 connected to VM3 133 reports (ID=LP3, INJECTED). At 632, DR1 120 reports (ID=DR1, RECEIVED+FORWARDED). At 633, EDGE 110 reports (ID=EDGE, RECEIVED+FORWARDED).

At 634, VGW 140 reports (ID=VGW, RECEIVED+FORWARDED). At 635, T0-GW 150 reports (ID=T0-GW, RECEIVED+FORWARDED). However, at 636, T1-CGW 153 reports (ID=T1-CGW, DROPPED) to indicate that packet P2 620 is dropped. In practice, VM6 156 may be unreachable for various reasons, such as firewall rule, power failure, hardware failure, software failure, network failure or congestion, a combination thereof, etc. The reason for dropping packet P2 520 may be included in report information 636/640. For example, the drop reason may indicate a problem relating to a logical forwarding element (e.g., virtual distributed router (VDR)), such as "no VDR found," "no VDR on host," "no route table found," "no VDR uplink," "no VDR downlink," or any combination thereof. SDN manager 270 may analyze report information 631-636 to determine whether a cross-cloud connectivity status=CONNECTED or DISCONNECTED (shown in FIG. 6).

Although described using cloud environments 101-102, it should be understood that examples of the present disclosure may be implemented for any suitable "first cloud environment" and "second cloud environment." For example in FIGS. 5-6, public cloud environment 102 may be connected with the Internet via an Internet gateway labelled as "IGW" 501, and another VPC supported by AWS via a gateway labelled "VDR-c" 502. Depending on the desired implementation, cross-cloud connectivity check may be performed to identify any connectivity issues between public cloud environment 102 and Internet/VPC. Additionally and/or alternatively, cross-cloud connectivity check may be performed to identify any connectivity issues between private cloud environment 101 and a different external cloud platform (not shown).

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs 131-134, 155-156. Containers are "OS-less", meaning that they do not include any OS that could weigh 10 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 6. For example, the instructions or program code, when executed by the processor of the computer system, may cause the processor to implement a "network device" or "computer system" to perform cross-cloud connectivity check according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network device that comprises an edge to perform cross-cloud connectivity checking, the method comprising:

detecting, by the edge, a first connectivity check packet that is injected by a first host and that is addressed from a first virtualized computing instance deployed at the first host in a first cloud environment that includes the edge; and in response to determination that the first connectivity check packet is destined for a second virtualized computing instance deployed at a second host in a second cloud environment, wherein the second cloud environment is different from the first cloud environment, and wherein the second cloud environment is reachable from the first cloud environment via a datapath between the first and second virtualized computing instances through the edge:

generating, by the edge, a second connectivity check packet by modification of the first connectivity check packet to include one or more indicators that a cross-cloud connectivity check is required along the datapath towards the second virtualized computing instance in the second cloud environment, wherein the one or more indicators are absent from the detected first connectivity check packet and are added to the first connectivity check packet via the modification; and sending, by the edge, the second connectivity check packet to cause one or more observation points in the second cloud environment along the datapath to, based on the one or more indicators, generate and send report information associated with the second connectivity packet to the edge.

2. The method of claim 1, wherein generating the second connectivity check packet comprises:
modifying, by the edge, source address information in the first connectivity check packet to specify a first indicator as a particular address that indicates to the one or more observation points that the connectivity check is required.

3. The method of claim 2, wherein generating the second connectivity check packet comprises:
modifying, by the edge, the source address information by replacing a source media access control (MAC) address associated with the first virtualized computing instance with the particular address.

4. The method of claim 2, wherein generating the second connectivity check packet comprises:
appending, by the edge, a second indicator as the particular address to the first connectivity check packet to cause the one or more observation points to compare the first indicator with the second indicator.

5. The method of claim 1, further comprising:
determining, by the edge, that the second cloud environment is reachable via the edge, wherein the first cloud environment is an on-premise, private cloud environment, and wherein the second cloud environment is a public cloud environment.

6. The method of claim 1, further comprising:
generating and sending, by the edge to a manager, report information that specifies that the second connectivity packet has been forwarded to the second cloud environment.

7. The method of claim 1, further comprising:
receiving, by the edge from the one or more observation points, report information that specifies whether the second connectivity packet has been received, forwarded, delivered, or dropped in the second cloud environment; and
sending, by the edge to a manager, the report information received from the one or more observation points.

8. A non-transitory computer-readable storage medium that includes a set of instructions which, in response to execution by a processor of a network device that comprises an edge, cause the processor to perform a method of cross-cloud connectivity checking, wherein the method comprises:
detecting, by the edge, a first connectivity check packet that is injected by a first host and that is addressed from a first virtualized computing instance deployed at the first host in a first cloud environment that includes the edge; and
in response to determination that the first connectivity check packet is destined for a second virtualized computing instance deployed at a second host in a second cloud environment, wherein the second cloud environment is different from the first cloud environment, and wherein the second cloud environment is reachable from the first cloud environment via a datapath between the first and second virtualized computing instances through the edge:
generating, by the edge, a second connectivity check packet by modification of the first connectivity check packet to include one or more indicators that a cross-cloud connectivity check is required along the datapath towards the second virtualized computing instance in the second cloud environment, wherein the one or more indicators are absent from the detected first connectivity check packet and are added to the first connectivity check packet via the modification; and
sending, by the edge, the second connectivity check packet to cause one or more observation points in the second cloud environment along the datapath to, based on the one or more indicators, generate and send report information associated with the second connectivity packet to the edge.

9. The non-transitory computer-readable storage medium of claim 8, wherein generating the second connectivity check packet comprises:
modifying, by the edge, source address information in the first connectivity check packet to specify a first indicator as a particular address that indicates to the one or more observation points that the connectivity check is required.

10. The non-transitory computer-readable storage medium of claim 9, wherein generating the second connectivity check packet comprises:
modifying, by the edge, the source address information by replacing a source media access control (MAC) address associated with the first virtualized computing instance with the particular address.

11. The non-transitory computer-readable storage medium of claim 9, wherein generating the second connectivity check packet comprises:
appending, by the edge, a second indicator as the particular address to the first connectivity check packet to cause the one or more observation points to compare the first indicator with the second indicator.

12. The non-transitory computer-readable storage medium of claim 8, wherein the method further comprises:
determining, by the edge, that the second cloud environment is reachable via the edge, wherein the first cloud environment is an on-premise, private cloud environment, and wherein the second cloud environment is a public cloud environment.

13. The non-transitory computer-readable storage medium of claim 8, wherein the method further comprises:
generating and sending, by the edge to a manager, report information that specifies that the second connectivity packet has been forwarded to the second cloud environment.

14. The non-transitory computer-readable storage medium of claim 8, wherein the method further comprises:
receiving, by the edge from the one or more observation points, report information that specifies whether the second connectivity packet has been received, forwarded, delivered, or dropped in the second cloud environment; and
sending, by the edge to a manager, the report information received from the one or more observation points.

15. A computer system that comprises an edge configured to perform cross-cloud connectivity checking, the computer system comprising:
a processor of the edge; and
a non-transitory computer-readable medium of the edge and having stored thereon instructions that, in response to execution by the processor, cause the processor to:
detect, by the edge, a first connectivity check packet that is injected by a first host and that is addressed from a first virtualized computing instance deployed at the first host in a first cloud environment that includes the edge; and in response to determination that the first connectivity check packet is destined for a second virtualized computing instance deployed at a second host in a second cloud environment, wherein the second cloud environment is different from the first cloud environment, and wherein the second cloud environment is reachable from the first cloud environment via a datapath between the first and second virtualized computing instances through the edge:

generate, by the edge, a second connectivity check packet by modification of the first connectivity check packet to include one or more indicators that a cross-cloud connectivity check is required along the datapath towards the second virtualized computing instance in the second cloud environment, wherein the one or more indicators are absent from the detected first connectivity check packet and are added to the first connectivity check packet via the modification; and send, by the edge, the second connectivity check packet to cause one or more observation points in the second cloud environment along the datapath to, based on the one or more indicators, generate and send report information associated with the second connectivity packet to the edge.

16. The computer system of claim 15, wherein the instructions that cause the processor to generate the second connectivity check packet cause the processor to:

modify, by the edge, source address information in the first connectivity check packet to specify a first indicator as a particular address that indicates to the one or more observation points that the connectivity check is required.

17. The computer system of claim 16, wherein the instructions that cause the processor to generate the second connectivity check packet cause the processor to:

modify, by the edge, the source address information by replacing a source media access control (MAC) address associated with the first virtualized computing instance with the particular address.

18. The computer system of claim 16, wherein the instructions that cause the processor to generate the second connectivity check packet cause the processor to:

append, by the edge, a second indicator as the particular address to the first connectivity check packet to cause the one or more observation points to compare the first indicator with the second indicator.

19. The computer system of claim 15, wherein the instructions further cause the processor to:

determine, by the edge, that the second cloud environment is reachable via the edge, wherein the first cloud environment is an on-premise, private cloud environment, and wherein the second cloud environment is a public cloud environment.

20. The computer system of claim 15, wherein the instructions further cause the processor to:

generate and send, by the edge to a manager, report information that specifies that the second connectivity packet has been forwarded to the second cloud environment.

21. The computer system of claim 15, wherein the instructions further cause the processor to:

receive, by the edge from the one or more observation points, report information that specifies whether the second connectivity packet has been received, forwarded, delivered or dropped in the second cloud environment; and send, by the edge to a manager, the report information received from the one or more observation points.

* * * * *